United States Patent
Sullivan et al.

(10) Patent No.: US 9,843,565 B2
(45) Date of Patent: *Dec. 12, 2017

(54) WEB FORM PROTECTION

(71) Applicant: CloudFlare, Inc., San Francisco, CA (US)

(72) Inventors: Nicholas Thomas Sullivan, San Francisco, CA (US); Zi Lin, San Francisco, CA (US); Rajeev Devendra Sharma, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,139

(22) Filed: Jul. 25, 2016

(65) Prior Publication Data

US 2016/0337324 A1    Nov. 17, 2016

Related U.S. Application Data

(63) Continuation of application No. 14/578,223, filed on Dec. 19, 2014, now Pat. No. 9,401,919.

(51) Int. Cl.
| | |
|---|---|
| *H04L 29/06* | (2006.01) |
| *G06F 17/30* | (2006.01) |
| *H04L 9/08* | (2006.01) |
| *H04L 9/14* | (2006.01) |
| *H04L 29/08* | (2006.01) |

(52) U.S. Cl.
CPC ...... *H04L 63/0435* (2013.01); *G06F 17/3089* (2013.01); *H04L 9/0819* (2013.01); *H04L 9/14* (2013.01); *H04L 63/0281* (2013.01); *H04L 63/061* (2013.01); *H04L 63/10* (2013.01); *H04L 67/2842* (2013.01); *H04L 63/168* (2013.01); *H04L 2209/24* (2013.01)

(58) Field of Classification Search
CPC ........ G06F 21/53; G06F 21/62; H04L 67/02; H04L 67/28; H04L 67/2814; H04L 63/0428; H04L 63/0457; H04L 63/1466

See application file for complete search history.

(56) References Cited

U.S. PATENT DOCUMENTS

| | | | | |
|---|---|---|---|---|
| 6,938,170 | B1 * | 8/2005 | Kraft | G06F 17/3089 707/999.005 |
| 2002/0152378 | A1 | 10/2002 | Wallace, Jr. | |
| 2009/0144546 | A1 * | 6/2009 | Jancula | H04L 63/0428 713/168 |
| 2010/0299722 | A1 * | 11/2010 | Tewari | H04L 12/14 726/3 |
| 2011/0283359 | A1 | 11/2011 | Prince et al. | |
| 2016/0330172 | A1 * | 11/2016 | Muttik | H04L 63/0281 |

\* cited by examiner

*Primary Examiner* — Noura Zoubair
(74) *Attorney, Agent, or Firm* — Nicholson De Vos Webster & Elliott LLP

(57) ABSTRACT

A request for a web page is received and the requested web page is retrieved. The web page is modified to obfuscate a set of form attribute values into a corresponding set of obfuscated form attribute values. The modified web page is transmitted to the requesting device. The modified web page does not include the set of form attribute values in their original form. Form data for the set of obfuscated form attribute values is received from the requesting device. The set of obfuscated form attribute values is deobfuscated thereby revealing the original set of form attribute values. The form data for the set of original form attribute values is further processed.

18 Claims, 9 Drawing Sheets

```
200
   \
     <html>
     <style> .red input { color:red; font-size:25px;} </style>
     <body>
                                          215 ─┐  220 ─┐
     <form action="http://example.com" id="searchbox" class="red">
         └─ 255  └─ 260   225 ─┐  230 ─┐
       <input type="hidden" name="type" value="query" />
210 {              235 ─┐  240 ─┐
       <input type="text" name="q" size="10" />
                         245 ─┐  250 ─┐
       <input type="submit" name="su" value="Search" />
     </form>
     </body>
     </html>
```

FIG. 2

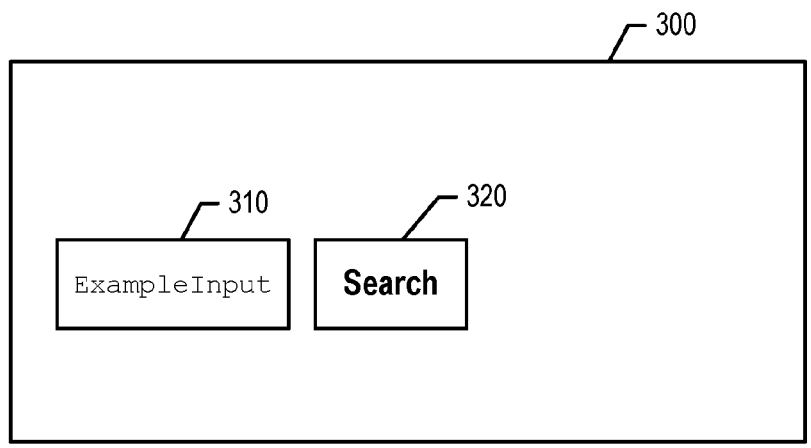

FIG. 3

```
POST / HTTP/1.1
Host: example.com
type=query&q=ExampleInput&su=Search
410 ─┘        420 ─┘              430 ─┘
```

FIG. 4

```
       <html>
500    <style> .red input { color:red; font-size:25px;} </
  \    style>
       <body>
                                         215 ─╮  520 ─╮
       <form action="http://example.com" id="xy17"
       class="1334s">
          └─ 255   └─ 560      225 ─╮  530 ─╮
          <input type="hidden" name="n843" value="query" />
510                       235 ─╮  540 ─╮
          <input type="text" name="s3j!!" size="10" />
                             245 ─╮  550 ─╮
          <input type="submit" name="o21n" value="Search" />
       </form>
       </body>
       </html>
```

FIG. 5

```
       POST / HTTP/1.1
       Host: example.com
       n843=query&s3j!!=ExampleInput&o21n=Search
     610 ─╯          620 ─╯                  630 ─╯
```

FIG. 6

```
700
  ↘  <html>
     <style> .red input { color:red; font-size:25px;} </
     style>
     <body>
                                      215 ┐    720 ┐
   ┌ <form action="http://example.com" id="KEY(searchbox)"
   │ class="KEY(red)">
   │      ↖ 255  ↖ 760
   │ <div>
   │           225 ┐  730 ┐
   │  <input type="hidden" name="KEY(type)" value="query" />
710 ┤        235 ┐  740 ┐
   │  <input type="text" name="KEY(q)" size="10" />
   │            245 ┐  750 ┐
   │  <input type="submit" name="KEY(su)" value="Search" />
   │ </div>
   └ </form>
     </body>
     </html>
```

FIG. 7

```
POST / HTTP/1.1
Host: example.com
KEY(type)=query&KEY(q)=ExampleInput&KEY(su)=Search
 810 ⌐          820 ⌐                    830 ⌐
```

FIG. 8

WEB FORM PROTECTION

CROSS-REFERENCE TO RELATED APPLICATIONS

This application is a continuation of application Ser. No. 14/578,223, filed Dec. 19, 2014, which is hereby incorporated by reference.

FIELD

Embodiments of the invention relate to the field of network communications; and more specifically to web form protection.

BACKGROUND

Many webpages include one or more web forms that commonly have fields to collect information from users to transmit to a server for processing. Common examples of web forms include payment forms, registration forms, shipping forms, etc. These web forms are commonly the target of bots and other malicious software. For example, a malicious webpage crawler may load a website and programmatically find form fields and using that information, construct malicious requests directed to the server delivering the web page (e.g., the origin server). In addition, keyloggers (hardware or software that captures keystrokes), local network-sniffing malware, and/or browser-based malware may intercept/sniff requests in an attempt to understand the Application Programming Interfaces (APIs) used by the website for directed attacks.

The HTML of the web form may include one or more HTML attributes (sometimes referred herein as form attributes). An attribute typically takes the format of a name/value pair such as "name='value'" where the "name" portion identifies the name of the attribute and the "value" portion sets the attribute to the provided value.

BRIEF DESCRIPTION OF THE DRAWINGS

The invention may best be understood by referring to the following description and accompanying drawings that are used to illustrate embodiments of the invention. In the drawings:

FIG. 2 illustrates example HTML code of a web form;

FIG. 3 illustrates the web page of the HTML code illustrated in FIG. 2 rendered by a network application of a requesting device;

FIG. 4 illustrates exemplary form data submitted in response to a selection of the submit button of FIG. 3 according to one embodiment;

FIG. 5 illustrates the example HTML code of FIG. 2 that has been modified such that form attribute values are obfuscated through a replacement of the original form attribute value with a random or pseudorandom value according to one embodiment;

FIG. 6 illustrates exemplary form data submitted in response to a selection of the submit button of FIG. 3 according to one embodiment when the code of the web page has been modified in accordance with the embodiment illustrated in FIG. 5;

FIG. 7 illustrates the example HTML code of FIG. 2 that has been modified to obfuscate form attribute values by encrypting those attribute values with a symmetric key derived from a set of one or more values of a set of one or more characteristics respectively from the requesting network application;

FIG. 8 illustrates exemplary form data submitted in response to a selection of the submit button of FIG. 3 according to one embodiment when the code of the web page has been modified according to FIG. 7;

DESCRIPTION OF EMBODIMENTS

Figure 1:
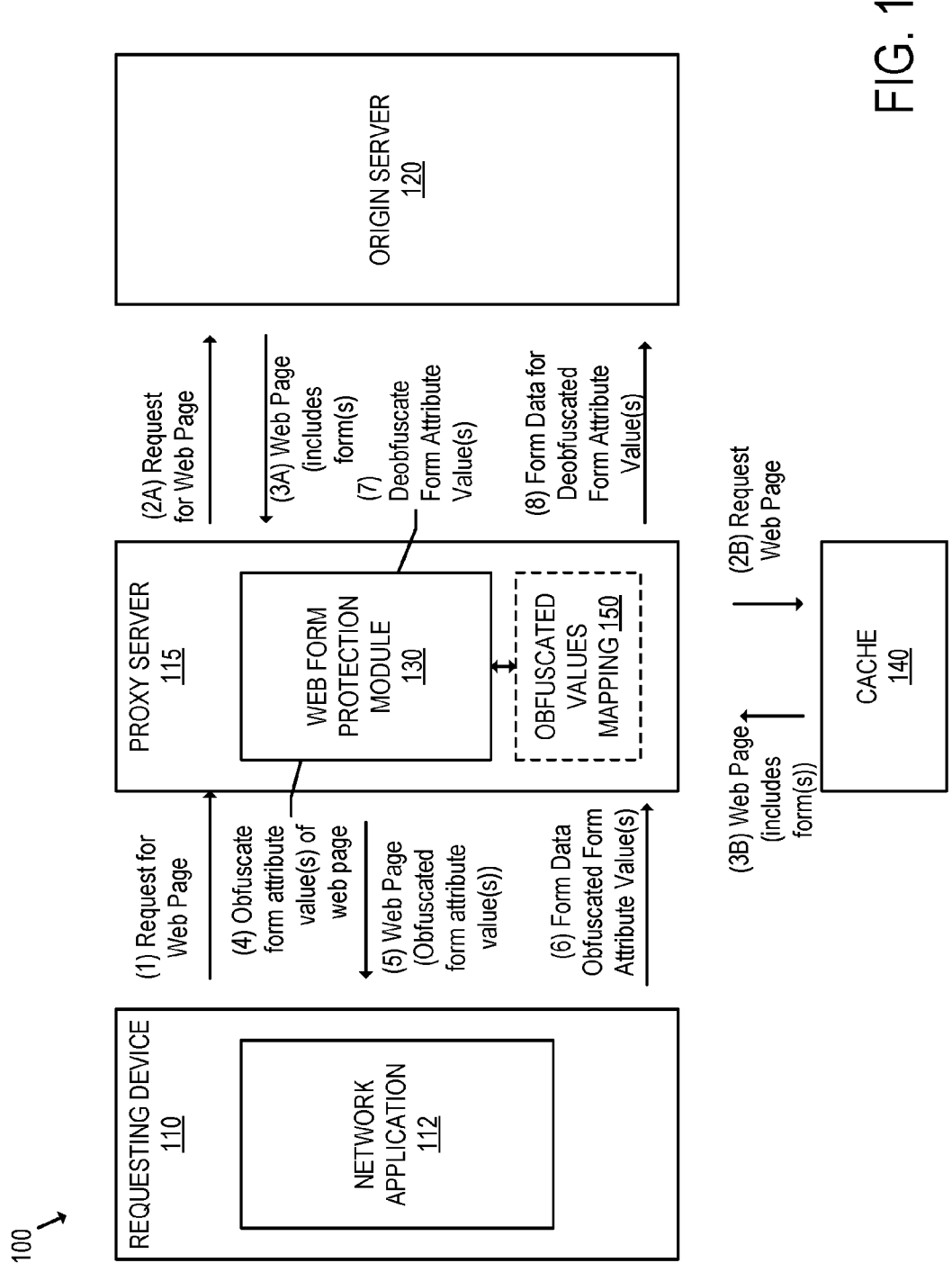
FIG. 1 illustrates an exemplary system for web form protection according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for protecting web forms is described herein. In one embodiment, a web page is modified by at least obfuscating one or more attributes of a web form (e.g., the name part of the attribute and/or the value part of the attribute) and the modified web page is transmitted to a requesting device. Form data is received for the obfuscated one or more attributes from the requesting device. The obfuscated attributes are deobfuscated and the form data is processed.

In a specific embodiment, a proxy server that is situated between the requesting device and an origin server obfuscates the attribute(s) of one or more web forms of the web page prior to sending the web page to the requesting device and deobfuscates the attribute(s) prior to sending the form data to the origin server. For example, a proxy server receives a request for a web page from a client device. The proxy server retrieves the requested web page (e.g., from cache available to the proxy server or by transmitting a request to the origin server of the web page and receiving the web page from the origin server). Upon determining that the web page includes a web form, the proxy server modifies the web page by obfuscating one or more form attributes of the web form of the web page and transmits the modified web page to the requesting device. By way of a specific example, the form attributes that are obfuscated may include the name and/or value for any "name" attributes in the form element, the name and/or value for any "id" attributes in the form element, and/or the name and/or value for any CSS (or other styling) class name attributes in the form element. Upon receiving form data from the requesting device for the one or more obfuscated attributes, the proxy server deobfuscates the set of one or more obfuscated attributes and transmits the form data with the deobfuscated attributes to the origin server for further processing. For example, the proxy server may receive the form data in an HTTP GET request or an HTTP POST request or through other ways.

The obfuscation of the attribute(s) may be done differently in different embodiments. In one embodiment, known form attributes are replaced with pseudorandom or random values. The pseudorandom or random values may be generated in a number of ways. By way of example, a pseudorandom number generator (PRNG), a cryptographically secure pseudorandom number generator (CSPRNG), or a hardware random number generator may be used. The random or pseudorandom value may be received from a random number server or may be generated on the device performing the obfuscation and deobfuscation.

In some embodiments, a mapping is stored between the original attributes (prior to obfuscation) and the obfuscated attributes. This mapping is accessed when deobfuscating the obfuscated form attributes. For example, the proxy server may store a hash map that associates the original attribute (prior to the obfuscation) with the obfuscated attribute. When form data is received for an obfuscated attribute, the proxy server may use the hash map to look up the corresponding real attribute.

In other embodiments, the one or more obfuscated attributes are generated in a manner such that the original attributes can be determined without storing a mapping on the device performing the deobfuscation. For example, in some embodiments, the proxy server generates a symmetric key based on a set of one or more values of a set of one or more characteristics respectively of the requesting client network application, modifies the web page by obfuscating one or more attributes of the web form by encrypting each of those attribute(s) with the symmetric key, and transmits the modified web page to the requesting client network application. The proxy server may also prepend or append a magic value prior to encrypting each value to be obfuscated. Upon receiving form data from the requesting client device for one or more obfuscated attributes, the proxy server generates a symmetric key based on the set of values of the set of characteristics of the requesting client network application, deobfuscates the attributes by decrypting each obfuscated attribute using the symmetric key (and checking the magic value for confirmation if used), and transmits the form data with the deobfuscated attributes to the origin server for further processing. By way of example, the set of characteristics may include the IP address of the requesting client network application. As another example, the set of characteristics may be used to generate a fingerprint of the requesting client network application (e.g., generated by the proxy server) that is generated based on one or more of the following: whether the client network application loads images; whether the client network application executes JavaScript; the type of client network application (e.g., browser name and version); the operating system running the client network application; the fonts installed on the client network application; the languages supported by the client network application; whether the client network application supports plugins; whether the client network application stores cookies; whether the client network application responds from the same IP address for various protocol requests, the IP address of the client network application, etc.

In another embodiment, the one or more obfuscated values are generated in manner such that the original attribute values can be determined without storing the mapping between the original values and the obfuscated values on the proxy server and is based at least on a time period. For example, in some embodiments, to obfuscate the attribute values, the proxy server generates a symmetric key based on the set of values of the set of characteristics of the requesting client network application and the current time rounded to a given unit (e.g., day, hour, etc.), modifies the web page by obfuscating one or more attribute values of the web form by encrypting each of those attribute value(s) with the symmetric key, and transmits the modified web page to the requesting client network application. The proxy server may also prepend or append a magic value prior to encrypting each value to be obfuscated. Upon receiving form data from the requesting client device for one or more obfuscated attribute values, the proxy server generates a symmetric key based on the set of values of the set of characteristics of the requesting client network application and the current time period, and attempts to deobfuscate the attribute value(s) by decrypting each obfuscated attribute value using the symmetric key (and checking the magic value for confirmation if used). If decrypting fails (which potentially could happen if the key used for encryption was generated in a different time period), the proxy server generates another symmetric key based on the set of values of the set of characteristics of the requesting client network application and the most immediately previous time period and attempts to decrypt the attribute value(s) using that key. This procedure may be done a threshold number of times in an attempt to decrypt the attribute value(s). If decryption is successful, the proxy server transmits the form data with the deobfuscated attribute values to the origin server for further processing. To determine whether the decryption was successful, a Keyed-Hashing Message Authentication Code (HMAC) may be used or an authenticated encryption mode (such as Advanced Encryption Standard-Galois/Counter Mode (AES-GCM)) may be used.

Some web pages or web applications include references or lookups to the form attribute values. By way of example, some web pages or web applications construct requests from form elements dynamically using client side scripting libraries such as jQuery. This client-side scripting code can use a DOM selector to extract the form attribute values when submitting the form data. In one embodiment, for a web page that includes a reference or lookup to the form attribute values, the proxy server modifies the web page by inserting a client-side script that overrides the original references or lookups (e.g., overrides the client-side scripting code that extracts the form attribute values) with a lookup structure such as a lookup table. For each attribute value that is obfuscated, the lookup structure maps the original attribute value with the obfuscated attribute value such that the lookup or reference performed by the code (e.g., the client-side script) results in the obfuscated attribute value being returned. For any attribute value that is not obfuscated, the lookup structure maps the original attribute value with itself.

In one embodiment, the web page is modified to include the mapping between the original attribute value(s) (prior to obfuscation) and the obfuscated attribute value(s). This mapping may be encrypted by a key that is known only to the device performing the obfuscation and deobfuscation. The web page may further be modified to include code (e.g., a client-side script) that is configured to transmit the mapping upon the form submission.

In some embodiments, the one or more obfuscated attribute values are generated in a manner such that the original attribute value(s) can be determined without storing a mapping on the proxy server performing the deobfuscation such as by encrypting the attribute values with a key known only to the device performing the obfuscation and deobfuscation. A random value may be prepended or appended to each value prior to encryption to provide for randomness. Upon receiving form data from the requesting client device for one or more obfuscated attribute values, the proxy server attempts to deobfuscate the attribute value(s) by decrypting each attribute value using the key and removing the random value if used. If decrypting fails, the proxy server would not process the received form data. If decryption succeeds, the proxy server transmits the form data with the deobfuscated attribute values to the origin server for further processing. To determine whether the decryption was successful, a Keyed-Hashing Message Authentication Code (HMAC) may be used or an authenticated encryption mode (such as Advanced Encryption Standard-Galois/Counter Mode (AES-GCM)) may be used. For example, a MAC may be generated in conjunction with encrypting the attribute value and stored in a predefined portion of the obfuscated attribute value. When decrypting, a MAC is generated and compared with the MAC stored in the predefined portion of the obfuscated attribute value to determine if they are the same, which is an indication that decryption was successful.

In some other embodiments, the mapping between the original attribute value(s) (prior to obfuscation) and the obfuscated attribute value(s) is encrypted with a key and included in a cookie set by the proxy server and transmitted to the requesting client device. The key may be generated based on a set of one or more values of a set of one or more characteristics of the requesting client device or may be a key known only to the proxy server. The requesting client device transmits the cookie when submitting the form data. Upon receiving form data from the requesting client device for one or more obfuscated attribute values, the proxy server reads the mapping from the cookie and decrypts the mapping using the key (which it may need to generate if a key based on the set of characteristics of the requesting client device is used). This mapping is then used to look up the corresponding real attribute values thereby deobfuscating the attribute values. The proxy server may send the form data with the deobfuscated attribute values to the origin server for further processing.

While embodiments have been described with respect to a proxy server obfuscating and deobfuscating the form attribute values, in other embodiments similar techniques may be used at an origin server or other network architecture. For example, an origin server may obfuscate the form attribute value(s) prior to transmitting the web page to the requesting device and deobfuscate the form attribute value(s) when receiving form data.

FIG. 1 illustrates an exemplary system 100 for web form protection according to one embodiment. The system includes the requesting device 110, the proxy server 115, the origin server 120, and the cache 140 (optional). The requesting device 110 is a computing device (e.g., desktop, laptop, smartphone, mobile phone, tablet, gaming system, set-top box, server, wearable computing device, etc.) that includes the network application 112 (e.g., a web browser or other application) that is capable of requesting and receiving web resources from the origin server 120 and submitting form data.

The proxy server 115 is a computing device that is situated between the requesting device 110 and the origin server 120. The proxy server 115 receives and processes certain traffic between the requesting device 110 and the origin server 120. In one embodiment, the proxy server 115 is a reverse proxy server. Web traffic (e.g., HTTP requests/responses, HTTPS requests/responses, SPDY requests/responses, etc.) for domain(s) serviced by the origin server 120 may be received and processed at the proxy server 115. As will be described in greater detail later herein, the proxy server 115 retrieves a requested web page either from the origin server 120 or from cache 140 that includes a web form with one or more form attributes, obfuscates one or more form attributes prior to transmitting the web page to the requesting device 110, receives form data for the obfuscated form attributes from the requesting device 110, deobfuscates the form attributes, and transmits the form data with the deobfuscated form attribute values to the origin server 120.

The origin server 120 maintains web page(s) for one or more domains. Although FIG. 1 illustrates the proxy server 115 communicating with a single origin server 120, in some embodiments the proxy server 115 communicates and provides services for additional origin servers and different domains that may be owned by different entities. In one embodiment, the proxy server 115 and the services it provides is part of a cloud-based proxy service that provides services for domain owners. By way of example, the cloud-based proxy service may provide a service to protect online form submission as described herein. The cloud-based proxy service may also provide security services (e.g., detecting and/or mitigating denial of service attacks, proactively stopping botnets, cleaning viruses, trojans, and/or worms, etc.) and/or other performance services (e.g., acting as a node in a content delivery network (CDN) and dynamically caching customer's files closer to visitors, TCP stack optimizations, etc.).

The proxy server 115 receives a request from the network application 112 of the requesting device 110 for a web page that resides or is created at the origin server 120 at operation 1. The request may be an HTTP GET request for example. The proxy server 115 may receive the request for the web page in a number of different ways. In one embodiment, the request is received at the proxy server 115 as a result of a Domain Name System (DNS) request for the domain of the requested web page returning an IP address of the proxy server 115 instead of the origin server 120. In such an embodiment, the domain of the web page resolves to an IP address of the proxy server 115 instead of an IP address of the origin server 120. In some embodiments, multiple domains that may be owned by different domain owners may resolve to the proxy server 115 (e.g., resolve to the same IP address or a different IP address of the proxy server 115). In one embodiment, the proxy server 115 is one of multiple proxy servers that are geographically distributed and are anycasted to the same IP address or the same set of IP addresses. The proxy server 115 may receive the request because it is the closest proxy server to the requesting device 110 in terms of routing protocol metrics (e.g., Border Gateway Protocol (BGP) metrics) according to an Anycast implementation as determined by the network infrastructure (e.g., the routers, switches, or other network equipment between the requesting device 110 and the proxy server 115) that is not illustrated in FIG. 1 for simplicity purposes.

After receiving the request for the web page, the proxy server 115 retrieves the requested web page either from the origin server 120 or from the cache 140 if available and not expired. For example, the proxy server 115 determines whether the requested web page is available in the cache 140 (e.g., the web page is in the cache 140 and is not expired). The proxy server 115 retrieves the web page from the cache 140 if it is available; otherwise the proxy server 115 transmits a request for the web page to the origin server 120. For example, at operation 2A (the web page is not available in cache 140), the proxy server 115 transmits a request for the web page to the origin server 120. The request in operation 2A is similar to the request in operation 1. Assuming that the origin server 120 has access to the requested web page, then at operation 3A the origin server 120 transmits a response that includes the web page to the proxy server 115. At operation 2B (the web page is available in cache 140), the proxy server 115 requests the web page from the cache 140 and receives the requested web page from the cache 140 in operation 3B. The retrieved web page includes one or more forms, each of which includes one or more form attributes and corresponding form attribute values.

FIG. 2 illustrates example HTML code 200 with a web form. As illustrated in FIG. 2, the form element 210 includes the opening tag <form>, the closing tag </form>, and a number of form elements and attributes within the opening tag and closing tag including the attribute named "id" 215, the attribute named "name" 225, the attribute named "name" 235, the attribute named "name" 240, and the attribute named "class" 255. The "id" attribute 215 has the value 220 of "searchbox", the "name" attribute 225 has the value 230 of "type", the "name" attribute 235 has the value 240 of "q", the "name" attribute 245 has the value 250 of "su", and the "class" attribute 255 has the value 260 of "red". The "class" attribute 255 provides the style class name.

FIG. 3 illustrates the web page 300 of the HTML code 200 rendered by a network application of a requesting device. The web page 300 includes the text box 310 that is configured to allow a user to input text (the text box 310 corresponds to the input tag that has the type attribute value "text" of FIG. 2) and the submit button 320 that is configured to, when selected by a user, submit the data input into the text box 310 (the submit button 320 corresponds to the input tag that has the type input "submit" of FIG. 2). As illustrated in FIG. 3, a user has input the text "ExampleInput" into the text box 310. FIG. 4 illustrates exemplary form data submitted in response to a selection of the submit button 320 of FIG. 3 according to one embodiment. FIG. 4 illustrates the form data submission through an HTTP POST request; however it should be understood that the form data can be submitted in other ways (e.g., an HTTP GET request or other way). The attribute value 230 ("type") is included in the POST request at 410, the attribute value 240 ("q") is included in the POST request at 420, and the attribute value 250 ("su") is included in the POST request at 430.

Referring back to FIG. 1, the proxy server 115 includes the web form protection module 130 that is configured to obfuscate form attributes in web forms sent to requesting devices and deobfuscate form data corresponding to the obfuscated form attributes received from the requesting devices prior to transmission to the origin server 120. At operation 4, the web form protection module 130 of the proxy server 115 modifies the web page including obfuscating one or more form attributes in the one or more web forms included in the requested web page. The name part of the form attribute(s) and/or the value part of the form attribute(s) may be obfuscated. By way of a specific example, the form attribute values that are obfuscated may include the value for any "name" attributes in the form element, the value for any "id" attributes in the form element, and/or any value for any CSS (or other styling) class name attributes in the form element. It should be understood that these are specific examples and different, less, or more attribute values and/or attribute names may be obfuscated in accordance with the invention described herein. By way of example with reference to FIG. 2, the web form protection module 130 of the proxy server 115 may obfuscate the "id" attribute value 220, the "name" attribute value 230, the "name" attribute value 240, the "name" attribute value 250, and/or the "class" attribute value 260. In one embodiment the publisher of the webpage configures which form attribute values are to be obfuscated. In some embodiments, the web form protection module 130 of the proxy server 115 is configured with a default set of form attribute values for which it automatically obfuscates.

The obfuscation of the attribute value(s) may be done differently in different embodiments. In one embodiment, the web form protection module 130 replaces the form attribute component(s) (name and/or value) to be obfuscated with random or pseudorandom value(s). The pseudorandom or random values may be generated in a number of ways. By way of example, a pseudorandom number generator (PRNG), a cryptographically secure pseudorandom number generator (CSPRNG), or a hardware random number generator may be used. The random or pseudorandom value may be received from a random number server or may be generated on the device performing the obfuscation and deobfuscation.

In one embodiment, the proxy server 115 may store an obfuscated values mapping 150 between the original attributes (prior to obfuscation) and the obfuscated attributes that is accessed when deobfuscating the obfuscated attributes. For example, the proxy server 115 may store a hash map that associates the original attribute value (prior to the obfuscation) with the obfuscated value. When form data is received for an obfuscated value, the proxy server 115 may use the hash map to look up the corresponding real attribute value.

In another embodiment, the web page is modified to include a mapping between the original attribute value(s) (prior to obfuscation) and the obfuscated attribute value(s).

This mapping may be encrypted by a key that is known only to the device performing the obfuscation and deobfuscation (e.g., the proxy server 115). In such an embodiment, the web page may further be modified to include code (e.g., a client-side script) that is configured to transmit the mapping (which may be encrypted) upon form submission. Upon receiving form data for an obfuscated value and an encrypted mapping, the device performing the obfuscation and deobfuscation (e.g., the proxy server 115) may decrypt the mapping and then use the mapping to look up the corresponding real attribute value.

FIG. 5 illustrates the example HTML code of FIG. 2 that has been modified such that form attribute values are obfuscated through a replacement of the original form attribute value with a random or pseudorandom value according to one embodiment. As illustrated in FIG. 5, the modified HTML code 500 includes a modified form element 510 where the attribute value 520 of the "id" attribute 215 has been changed from "searchbox" to "xy17", the attribute value 560 of the "class" attribute 255 has been changed from "red" to "1334s", the attribute value 530 of the "name" attribute 225 has been changed from "type" to "n843", the attribute value 540 of the "name" attribute 235 has been changed from "q" to "s3j!!", and the attribute value 550 of the "name" attribute 245 has been changed from "su" to "o21n".

In another embodiment, the web form protection module 130 obfuscates form attribute value(s) by encrypting those attribute value(s) with a symmetric key (e.g., an Advanced Encryption Standard (AES) key, a Rivest Cipher 4 (RC4) key, etc.) derived from a set of one or more values of a set of one or more characteristics of the requesting client network application. By way of example, the set of characteristics used when generating the symmetric key may include one or more of the following: the IP address used by the requesting client network application 112 when transmitting the request for the web page; whether the client network application 112 loads images; whether the client network application 112 executes JavaScript; the type of client network application 112 (e.g., browser name and version); the operating system running the client network application 112; the fonts installed on the client network application 112; the languages supported by the client network application 112; whether the client network application 112 supports plugins; whether the client network application 112 stores cookies; whether the client network application 112 responds from the same IP address for various protocol requests, the IP address of the client network application 112, etc. The web form protection module 130 may also prepend or append a magic value prior to encrypting each value to be obfuscated that is used for confirmation when deobfuscating the values. Upon receiving form data from the requesting client network application 112 for one or more obfuscated attribute values, the web form protection module 130 generates a symmetric key based on a set of values of the same set of characteristics of the requesting client network application 112 and deobfuscates the attribute values by decrypting each obfuscated attribute value using the symmetric key (and checking the magic value for confirmation if used). Instead of using a magic value for confirmation, an authenticated encryption method may be used.

In another embodiment, the web form protection module 130 obfuscates the form attribute value(s) to be obfuscated by encrypting those attribute value(s) with a symmetric key (e.g., an AES key, an RC4 key, etc.) derived from a set of one or more values of a set of one or more respective characteristics of the requesting client network application 112 and the current time rounded to a given unit (e.g., day, hour, etc.). The web form protection module 130 may also prepend or append a magic value prior to encrypting each value to be obfuscated that is used for confirmation when deobfuscating the values. Upon receiving form data from the requesting network application 112 for one or more obfuscated attribute values, the web form protection module 130 generates a symmetric key based on the set of values of the set of characteristics of the requesting client network application 112 and the current time period, and attempts to deobfuscate the attribute value(s) by decrypting each obfuscated attribute value using the symmetric key (and checking the magic value for confirmation if used). If decrypting fails (which potentially could happen if the key used for encryption was generated in a different time period), the web form protection module 130 generates another symmetric key based on the set of values of the set of characteristics of the requesting client network application 112 and the most immediately previous time period and attempts to decrypt the attribute value(s) using that key. This procedure may be done a threshold number of times in an attempt to decrypt the attribute value(s).

FIG. 7 illustrates the example HTML code of FIG. 2 that has been modified to obfuscate form attribute values by encrypting those attribute values with a symmetric key derived from a set of one or more values of a set of one or more characteristics respectively from the requesting network application. As illustrated in FIG. 7, the modified HTML code 700 includes a modified form element 710 where the attribute value 720 of the "id" attribute 215 is changed to an encrypted version of the original value "searchbox" (this and other encrypted versions are represented in the Figure in the form of KEY(original value)) ("KEY(searchbox)"), the attribute value 760 of the "class" attribute 255 is changed to an encrypted version of the original value "red" ("KEY(red)"), the attribute value 730 of the "name" attribute 225 has been changed to an encrypted version of the original value "type" ("KEY(type)"), the attribute value 740 of the "name" attribute 235 has been changed to an encrypted version of the original value "q" ("KEY(q)"), and the attribute value 750 of the "name" attribute 245 has been changed to an encrypted version of the original value "su" ("KEY(su)").

In another embodiment, the web form protection module 130 obfuscates form attribute value(s) with a symmetric key (e.g., an Advanced Encryption Standard (AES) key, a Rivest Cipher 4 (RC4) key, etc.) known only to the device performing the obfuscation and deobfuscation that is not derived from the characteristics of the requesting client. A random value may be prepended or appended to each value prior to encryption to provide for randomness. Upon receiving form data from the requesting client device for one or more obfuscated attribute values, the device performing the deobfuscation attempts to deobfuscate the attribute value(s) by decrypting each attribute value using the key and removing the random value if used. If decryption fails, the received form data is not processed. If decryption succeeds, the form data is further processed (e.g., the proxy server transmits the form data with the deobfuscated attribute values to the origin server for further processing). To determine whether the decryption was successful, a Keyed-Hashing Message Authentication Code (HMAC) may be used or an authenticated encryption mode (such as Advanced Encryption Standard-Galois/Counter Mode (AES-GCM)) may be used.

In another embodiment, a mapping between the original attribute value(s) (prior to obfuscation) and the obfuscated attribute value(s) is encrypted with a key and included in a cookie set by the device performing the obfuscation and deobfuscation and transmitted to the requesting client device. The key may be generated based on a set of one or more values of a set of one or more characteristics of the requesting client device or may be a key known only to the device performing the obfuscation and deobfuscation. The requesting client device transmits the cookie when submitting the form data. Upon receiving form data from the requesting client device for one or more obfuscated attribute values, the device performing the deobfuscation reads the encrypted mapping from the cookie and decrypts the mapping using the key (which it may need to generate if a key based on the set of characteristics of the requesting client device is used). This mapping is then used to look up the corresponding real attribute values thereby deobfuscating the attribute values and the form data is further processed.

In some embodiments, the web form protection module 130 determines whether the web page includes any references or lookups to the original attribute values that are obfuscated and if it does, the web form protection module 130 modifies the web page to override the references to the original attribute values and replace those references with references to the corresponding obfuscated attribute values. For example, some web pages or web applications construct requests from form elements dynamically using client-side scripting libraries such as jQuery that uses DOM selectors to extract the form attribute values when submitting the form data. If one of these form attribute values to be extracted by a DOM selector is obfuscated, the original DOM selector code may not be able to extract the form attribute value (e.g., it may be looking for a specific value that is no longer present after obfuscation). In one embodiment, the web form protection module 130 inserts a client-side script into the page that, when executed by the network application 112, overrides any such DOM selector with a lookup table such that any lookup for an original attribute value that has been obfuscated will return the corresponding obfuscated value and any lookup for an original attribute value that has not been obfuscated will return the original attribute value.

After the web page has been modified, at operation 5, the proxy server 115 transmits the modified web page that includes the obfuscated form attribute value(s) to the requesting device 110 to be processed by the network application 112. In the embodiment where a mapping between the original attribute values and the obfuscated attribute values is set in a cookie (where such mapping may be encrypted), the proxy server 115 also sets such a cookie and transmits the cookie to the requesting device.

The network application 112 receives and processes the modified web page. Assuming that the web form(s) included in the web page are used (e.g., a user fills the field(s) of the web form and submits the values), at operation 6, the network application 112 of the requesting device 110 transmits form data for the obfuscated form attribute value(s) that is received by the proxy server 115. The form data may be transmitted in an HTTP GET request or an HTTP POST request, for example. The network application 112 may also transmit form data for other form attribute value(s) that are not obfuscated, which may also be received by the proxy server 115. In embodiments where a mapping between the original attribute value(s) and the obfuscated attribute value(s) was included in the modified web page or in a cookie, the network application 112 also transmits such mapping to the proxy server 115.

After receiving the form data for the obfuscated form attribute values, the web form protection module 130 deobfuscates the obfuscated form attribute values at operation 7 to reveal the original form attribute values. The way of deobfuscating depends on the way the form attribute values were obfuscated.

For example, if the form attribute values were obfuscated by replacing the original attribute values with random or pseudorandom values and the proxy server 115 includes a mapping between the original attribute values and the obfuscated values (e.g., the obfuscated values mapping 150), the web form protection module 130 accesses the mapping to determine the corresponding original attribute value for each respective one of the obfuscated form attribute values. Since the obfuscated values are random or pseudorandom values, the web form protection module 130 may cause each mapping to be removed after deobfuscation.

As another example, if the form attribute values were obfuscated by replacing the original attribute values with random or pseudorandom values and a mapping between the original attribute values and the obfuscated values encrypted was stored in the modified web page and returned by the network application 112 when submitting the form data, the web form protection module 130 decrypts the mapping and then accesses the mapping to determine the corresponding original attribute value for each respective one of the obfuscated form attribute values.

As another example, if the form attribute values were obfuscated by replacing the original attribute values with random or pseudorandom values and a mapping between the original attribute values and the obfuscated values encrypted was stored in a cookie set and transmitted to the network application 112 and the network application returns the cookie when submitting the form data, the web form protection module 130 decrypts the mapping from the cookie and then accesses the mapping to determine the corresponding original attribute value for each respective one of the obfuscated form attribute values.

As another example, if the set of form attribute values were obfuscated by encrypting the values with a symmetric key derived from a set of one or more values of a set of one or more characteristics respectively of the network application 112, the web form protection module 130 again generates a symmetric key derived from a set of values for the same set of characteristics of the network application 112 and uses that key to decrypt the encrypted values to reveal the original attribute values, and may check a magic value for confirmation if used in the encryption.

As another example, if the set of form attribute values were obfuscated by encrypting the values with a symmetric key derived from a set of one or more values of a set of one or more characteristics respectively of the network application 112 and the current time rounded to a given unit (e.g., day, hour, etc.), the web form protection module 130 again generates a symmetric key based on a set of values of the same set of characteristics of the network application 112 and the current time period, and attempts to deobfuscate the attribute value(s) by decrypting each obfuscated attribute value using the symmetric key (and checking the magic value for confirmation if used). If decrypting fails (which potentially could happen if the key used for encryption was generated in a different time period), the web form protection module 130 generates another symmetric key based on the values of the same set of characteristics of the requesting network application 112 and the most immediately previous time period and attempts to decrypt the attribute value(s) using that key. This procedure may be done a threshold number of times in an attempt to decrypt the attribute value(s).

As another example, if the set of form attribute values were obfuscated by encrypted the values with a key known only to the proxy server 115, the web form protection module 130 uses that key when deobfuscating the set of attribute values and removing the random value if used.

Assuming that the obfuscated form attribute value(s) were successful deobfuscated, at operation 8 the proxy server 115 transmits the form data for the deobfuscated form attribute value(s) (which will be the original form attribute value(s)) to the origin server 120 for further processing. For example, the origin server 120 receives the form data and processes it according to the functionality of the web page and web form.

Figure 9:
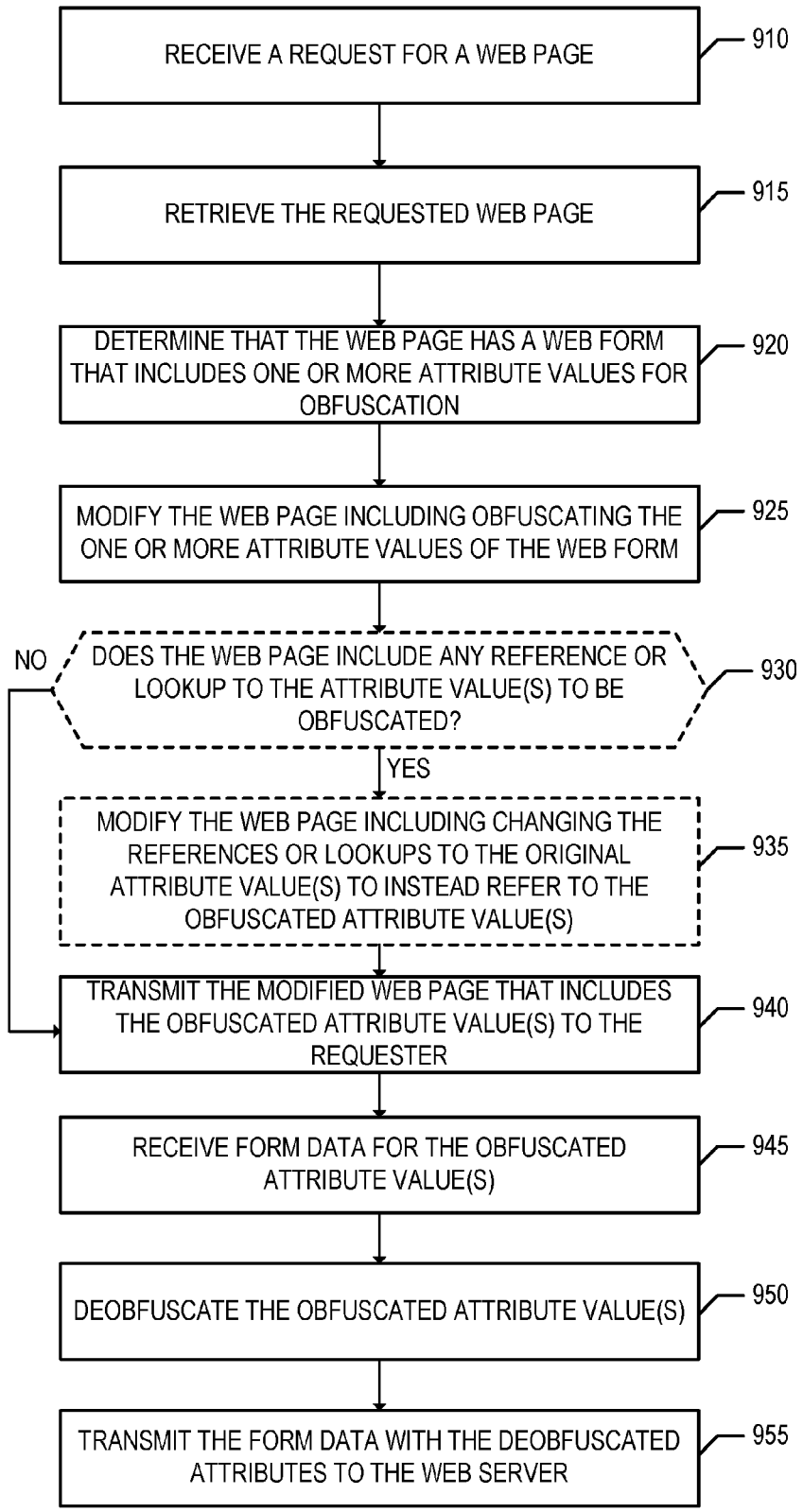
FIG. 9 is a flow diagram that illustrates exemplary operations performed by a proxy server for online submission form obfuscation according to one embodiment.

FIG. 9 is a flow diagram that illustrates exemplary operations performed by a proxy server for online submission form obfuscation according to one embodiment. The operations of this and other flow diagrams will be described with reference to the exemplary embodiment of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At operation 910, the proxy server 115 receives a request for a web page from the requesting device 110, where the web page resides or is created by the origin server 130. As previously described herein, the proxy server 115 may receive the request as a result of a DNS request for the domain of the requested web page returning an IP address of the proxy server 115 instead of the origin server 120.

Flow then moves to operation 915 where the proxy server 115 retrieves the requested web page. In some embodiments the proxy server 115 maintains or operates a cache of resources such as the cache 140. In such embodiments, the proxy server 115 retrieves the requested web page from the cache if available and if not expired. If the requested web page is not in cache or is expired, or if there is not a cache available to the proxy server 115, the proxy server 115 retrieves the requested web page from the origin server 120. For example, the proxy server 115 transmits a request for the requested web page to the origin server 120 and receives a response from the origin server 120 that includes the requested web page. Flow moves from operation 915 to operation 920.

At operation 920, the proxy server 115 determines that the web page has a web form that includes one or more attribute values for obfuscation. For example, the attribute values for obfuscation may include any "name" attribute values, any "id" attribute values, and/or any "class" attribute values included in the form element(s) of the web page. In embodiments where the publisher of the web page configured which form attribute values are to be obfuscated, the proxy server 115 accesses the configuration to determine which form attribute values are to be obfuscated. Flow moves from operation 920 to operation 925.

At operation 925, the proxy server 115 modifies the web page including obfuscating the determined one or more attribute values of the web form. As previously described, there are a number of ways the proxy server 115 may obfuscate attribute values of the web form such as replacing the original attribute values with random or pseudorandom values, encrypting the original attribute values with a symmetric key derived from a set of characteristics of the requesting device 110, encrypting the original attribute values with a symmetric key derived from a set of characteristics of the requesting device 110 and the current time rounded to a given unit (e.g., day, hour, etc.), or encrypting the original attribute values with a key known only to the proxy server 115. In one embodiment, the obfuscated attribute values do not change the functionality of the web page. In other words, the modified web page that includes the obfuscated attribute values visually looks the same to the user as the unmodified web page and operates the same to the user as the unmodified web page.

Figure 10:
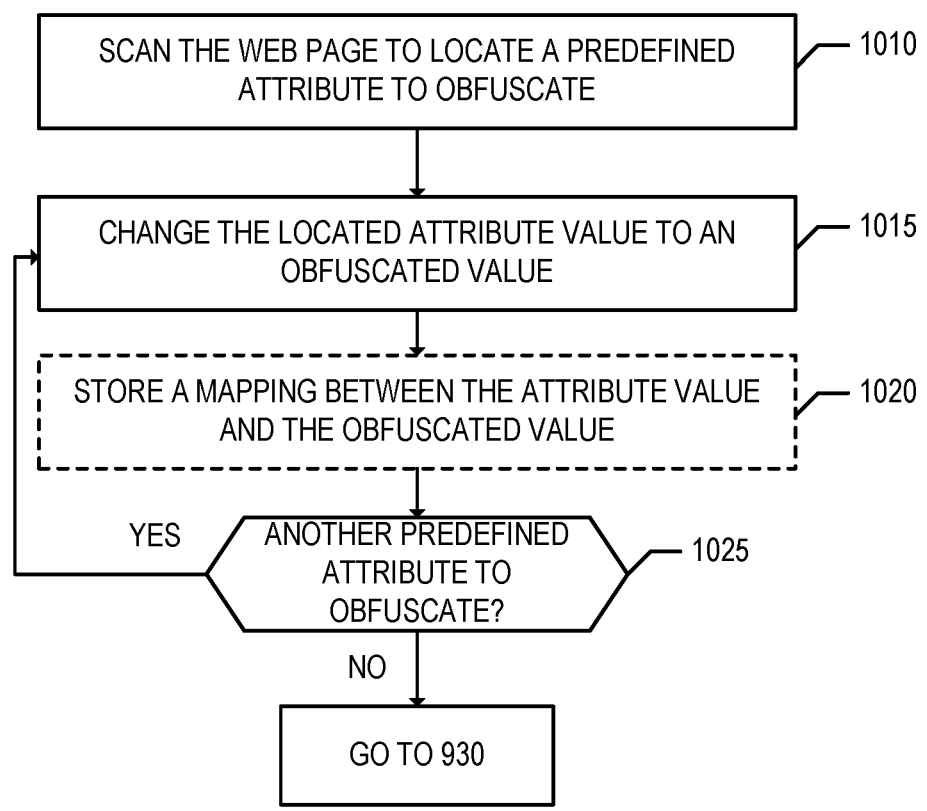
FIG. 10 is a flow diagram that illustrates exemplary operations for modifying the web page including obfuscating attribute value(s) of a web form according to one embodiment.

FIG. 10 is a flow diagram that illustrates exemplary operations for modifying the web page including obfuscating attribute value(s) of a web form according to one embodiment. In one embodiment the operations of FIG. 10 are performed when modifying the web page as described in operation 925. At operation 1010, the web form obfuscation and deobfuscation module 130 scans the web page to locate a predefined attribute to obfuscate. For example, if the "id" attribute value of a form element is to be obfuscated, the web page is scanned to locate any "id" attribute value within a form tag of the web page. Flow then moves to operation 1015 where the web form obfuscation and deobfuscation module 130 changes the located attribute value to an obfuscated value. Specific ways for obfuscating will be described with respect to FIGS. 11, 12, and 13.

Control moves from operation 1015 operation 1020, which is not performed in some embodiments, where a mapping between the original attribute value (prior to obfuscation) and the obfuscated attribute value is stored. A mapping is stored in those embodiments where the original form attribute values cannot otherwise be determined. For example, in embodiments where the form attribute value(s) are obfuscated by encrypting the attribute values with a key (either derived from a set of characteristics of the requesting device or otherwise available to the device performing the deobfuscation), a mapping may not be stored. In embodiments where the form attribute value(s) are replaced by random or pseudorandom values, the mapping may be stored.

In one embodiment, the obfuscation and deobfuscation module 130 causes the mapping to be stored in the proxy server 115 (e.g., in the obfuscated values mapping 150). In another embodiment, the web page may be modified to include the mapping and that mapping may be encrypted. For example, the obfuscation and deobfuscation module 130 may encrypt the mapping with a key that is not shared with the requesting client (e.g., the key may be known only by the proxy server 115) and modify the code of the web page to include the encrypted mapping. The web page may further be modified to include code (e.g., a client-side script) that is configured to transmit the mapping (which may be encrypted) upon form submission. In another embodiment, the mapping may be stored in a cookie set by the proxy server and transmitted to the requesting client device (the mapping may be encrypted with a key). Flow moves from operation 1020 to operation 1025 where the obfuscation and deobfuscation module 130 determines whether there is another predefined attribute to obfuscate. If there is, then flow moves back to operation 1015, if there is not, then flow moves to operation 930.

Figure 11:
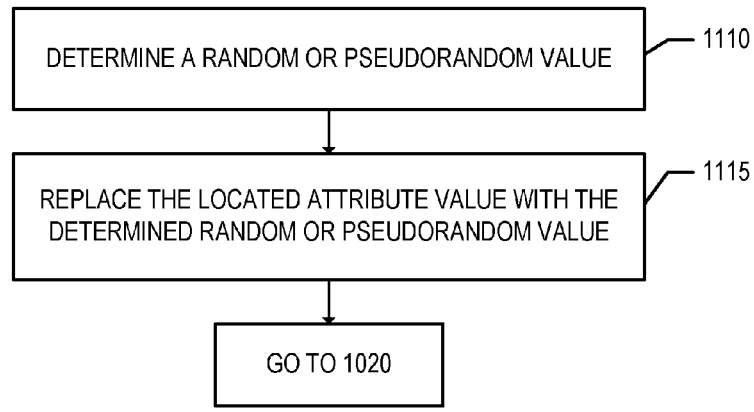
FIG. 11 is a flow diagram that illustrates exemplary operations for obfuscating an attribute value according to one embodiment.

FIG. 11 is a flow diagram that illustrates exemplary operations for obfuscating an attribute value according to one embodiment. In one embodiment the operations of FIG. 11 are performed to change the located attribute value to an obfuscated value as described in operation 1015. At operation 1110, the proxy server 115 determines a random or pseudorandom value. The proxy server 115 may generate the random or pseudorandom value in a number of ways. By way of example, a pseudorandom number generator (PRNG), a cryptographically secure pseudorandom number generator (CSPRNG), or a hardware random number generator may be used. The random or pseudorandom value may also be received from a random number server. After determining the random or pseudorandom value, flow then moves to operation 1115 where the proxy server 115 replaces the located attribute value with the determined random or pseudorandom value. Flow then moves to operation 1020.

Figure 12:
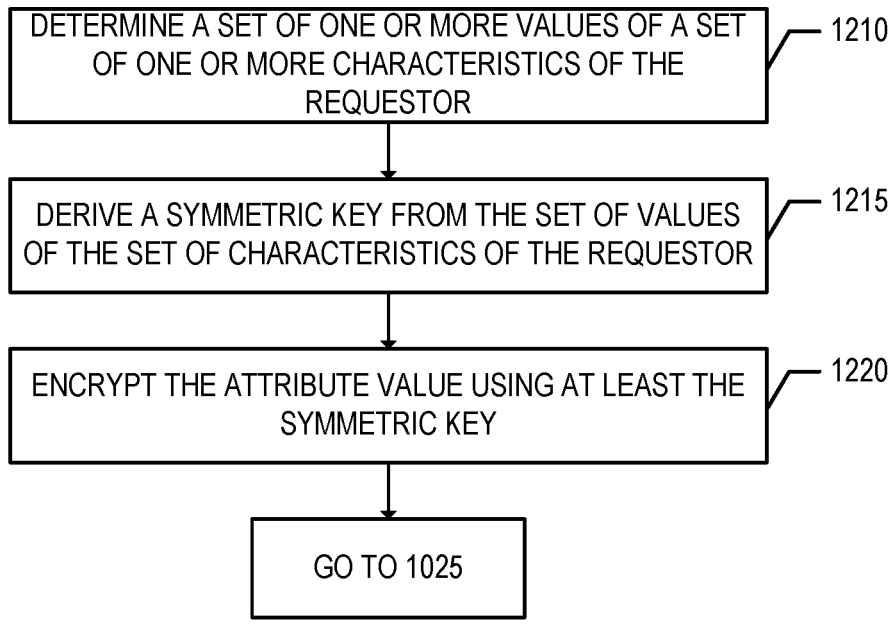
FIG. 12 is a flow diagram that illustrates exemplary operations for obfuscating an attribute value according to another embodiment.

FIG. 12 is a flow diagram that illustrates exemplary operations for obfuscating an attribute value according to another embodiment. In one embodiment the operations of FIG. 12 are performed to change the located attribute value to an obfuscated value as described in operation 1015. At operation 1210, the proxy server 115 determines a set of one or more values of a set of one or more characteristics of the network application 112 of the requesting device 110. By way of example, the set of characteristics may include one or more of the following: the IP address used by the requesting client network application 112 when transmitting the request for the web page; whether the client network application 112 loads images; whether the client network application 112 executes JavaScript; the type of client network application 112 (e.g., browser name and version); the operating system running the client network application 112; the fonts installed on the client network application 112; the languages supported by the client network application 112; whether the client network application 112 supports plugins; whether the client network application 112 stores cookies; whether the client network application 112 responds from the same IP address for various protocol requests, the IP address of the client network application 112, etc. In one embodiment, the set of characteristics are chosen such that the same values and characteristics are expected to remain the same for the network application 112 at least during the same session. Flow then moves from operation 1210 to operation 1215.

At operation 1215, the proxy server 115 derives a symmetric key from the set of values of the set of characteristics. The proxy server 115 may use any number of algorithms to derive the symmetric key. By way of example, the proxy server 115 may use an AES algorithm to derive an AES key from the set of values of the set of characteristics or use an RC4 algorithm to derive an RC4 key from the set of values of the set of characteristics. Flow then moves to operation 1220 where the proxy server 115 encrypts the attribute value to be obfuscated using at least the symmetric key. The proxy server 115 may also prepend or append a magic value to the attribute value to be obfuscate prior to encrypting. Flow then moves to operation 1025.

Figure 13:
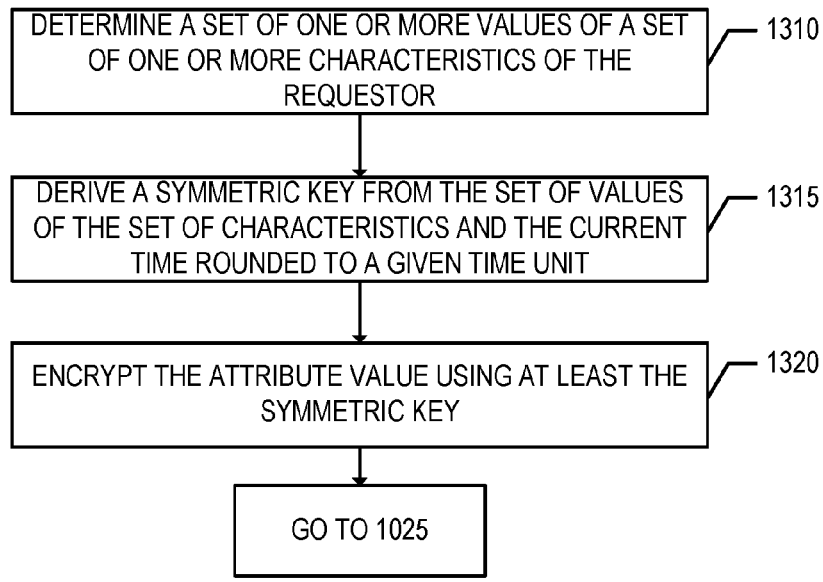
FIG. 13 is a flow diagram that illustrates exemplary operations for obfuscating an attribute value according to another embodiment.

FIG. 13 is a flow diagram that illustrates exemplary operations for obfuscating an attribute value according to another embodiment. In one embodiment the operations of FIG. 13 are performed to change the located attribute value to an obfuscated value as described in operation 1015. The operations of FIG. 13 are similar to the operations of FIG. 12 with the addition that the symmetric key that is derived also takes into account a time period. At operation 1310, the proxy server 115 determines a set of one or more values of a set of one or more characteristics of the network application 112 of the requesting device 110 in a similar way as described with respect to operation 1210. Flow then moves from operation 1310 to operation 1315 where the proxy server 115 derives a symmetric key from the set of values of the set of characteristics and the current time rounded to a given unit (e.g., day, hour, etc.). The proxy server 115 may use any number of algorithms to derive the symmetric key. By way of example, the proxy server 115 may use an AES algorithm to derive an AES key from the set of characteristics and the current time rounded to a given unit or use an RC4 algorithm to derive an RC4 key from the set of characteristics the current time rounded to a given unit. Flow then moves to operation 1320 where the proxy server 115 encrypts the attribute value to be obfuscated using at least the symmetric key. The proxy server 115 may also prepend or append a magic value to the attribute value to be obfuscate prior to encrypting. The proxy server 115 may also generate a MAC in conjunction with encrypting the attribute value (e.g., the MAC may be created on the original attribute value) and the MAC may be stored in a predefined portion of the obfuscated attribute value that may be used when determining whether decryption was successful. Flow then moves to operation 1025.

FIGS. 12 and 13 describe an embodiment where a symmetric key is derived from a set of characteristics and that key is used to obfuscate the form attribute values. In another embodiment, a key that is not shared with the requesting client and that is not derived from a set of characteristics is used to obfuscate and deobfuscate the form attribute values. For example, the key may be stored at the proxy server 115. A random value may be prepended or appended to each value prior to encryption to provide for randomness.

With reference back to FIG. 9, at operation 930, which is optional in some embodiments, the proxy server 115 determines whether the web page includes any reference or lookup to the form attribute value(s) to be obfuscated. For example, some web pages dynamically construct requests from form elements using client-side scripting libraries that use DOM selectors to extract the form attribute values when submitting the form data. If one of these form attribute values to be extracted by a DOM selector (or otherwise referenced by a different part of the web page) is obfuscated, the original extraction or reference code may not be able to extract or refer to the form attribute value (e.g., it may be looking for a specific value that is no longer present after obfuscation). If the web page includes any reference or lookup to the form attribute value(s) to be obfuscated, then flow moves to operation 935, otherwise flow moves to operation 940.

At operation 935, the proxy server 115 further modifies the web page including changing the reference(s) or lookup(s) to the original attribute value(s) to instead refer to the obfuscated attribute value(s). In one embodiment, the proxy server 115 inserts a client-side script into the web page that, when executed by the network application 112 of the requesting device 110, overrides any lookup or reference with a lookup table such that any lookup for an original form attribute value that has been obfuscated will return the corresponding obfuscated value and any lookup for an original attribute value that has not been obfuscated will return the original attribute value. Flow moves from operation 935 to operation 940.

In another embodiment, as an alternative to operation 935, after determining that the web page includes a reference or lookup to an attribute value that is to be obfuscated, instead of modifying the web page including changing the reference or lookup to the original attribute value(s) to instead refer to the obfuscated attribute value(s) as described in operation 935, the proxy server 115 does not obfuscate those form attribute value(s) that are referenced or used in a lookup by other parts of the web page.

At operation 940, the proxy server 115 transmits the modified web page that includes the obfuscated form attribute value(s) to the requesting device 110. For example, the proxy server 115 transmits an HTTP response message to the requesting device 110 that includes the modified web page. The modified web page does not include the original form attribute value(s) that were obfuscated. The network application 112 of the requesting device 110 will typically process the modified web page including rendering the content of the web page (e.g., displaying a form to the user for submission). Flow moves from operation 940 to operation 945.

At operation 945, the proxy server 115 receives form data for the obfuscated attribute values from the network application 112 of the requesting device 110. For example, the form data may be received from a submission through an HTTP POST request, an HTTP GET request, or other way of transmitting the form data. Flow moves from operation 945 to operation 950.

FIG. 6 illustrates exemplary form data submitted in response to a selection of the submit button 320 of FIG. 3 according to one embodiment when the code of the web page has been modified in accordance with the embodiment illustrated in FIG. 5. FIG. 6 illustrates the form data submission through an HTTP POST request; however it should be understood that the form data can be submitted in other ways (e.g., an HTTP GET request or other way). The obfuscated attribute value 530 ("n843") is included in the POST request at 610, the obfuscated attribute value 540 ("s3j!!") is included in the POST request at 620, and the attribute value 550 ("021n") is included in the POST request at 630.

FIG. 8 illustrates exemplary form data submitted in response to a selection of the submit button 320 of FIG. 3 according to one embodiment when the code of the web page has been modified according to FIG. 7. FIG. 8 illustrates the form data submission through an HTTP POST request; however it should be understood that the form data can be submitted in other ways (e.g., an HTTP GET request or other way). The obfuscated attribute value 730 ("KEY (type)") is included in the POST request at 810, the obfuscated attribute value 740 ("KEY(q)") is included in the POST request at 820, and the obfuscated attribute value 750 ("KEY(su)") is included in the POST request at 830.

With reference back to FIG. 9, at operation 950 the proxy server 115 deobfuscates the obfuscated attribute values. The method in which the proxy server 115 deobfuscates the obfuscated attribute values depends on the method in which those attribute values were obfuscated.

Figure 14:
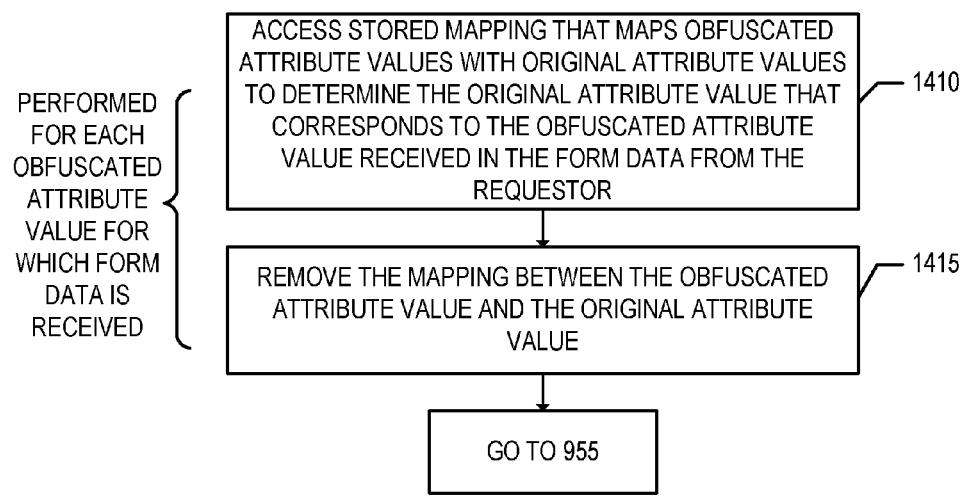
FIG. 14 is a flow diagram that illustrates exemplary operations for deobfuscating an obfuscated attribute value where a mapping between the original attribute values with obfuscated attribute values has been stored according to one embodiment.

FIG. 14 is a flow diagram that illustrates exemplary operations for deobfuscating an obfuscated attribute value where a mapping between the original attribute values with obfuscated attribute values has been stored according to one embodiment. At operation 1410, the proxy server 115 accesses the stored mapping between obfuscated attribute values and original attribute values to determine the original attribute value that corresponds with the obfuscated attribute value received in the form data from the requesting device 110. By way of example, if the proxy server 115 receives the obfuscated attribute value "n843" as illustrated in FIG. 6, the proxy server 115 accesses the stored mapping to determine the corresponding original attribute value, which is "type" in this example. Accessing the stored mapping may be different depending on the embodiment. In the embodiment where the mapping is stored on the proxy server 115 (e.g., the obfuscated values mapping 150), the proxy server 115 accesses the stored mapping using the received obfuscated attribute value to determine the corresponding original attribute value. In the embodiment where the mapping is stored on the web page (which may be encrypted) and transmitted by the requesting client device in conjunction with submission of the form data, the proxy server 115 decrypts the mapping (if encrypted) and accesses the mapping. In the embodiment where the mapping is stored in a cookie (which may be encrypted) and received from the requesting client device in conjunction with the submission of the form data, the proxy server 115 reads the cookie, decrypts the mapping (if encrypted), and accesses the mapping.

Flow then moves to operation 1415, which is optional in some embodiments, where the proxy server 115 removes the mapping between the obfuscated attribute value and the original attribute value. This mapping may be removed, for example, if being stored on the proxy server 115. Flow then moves to operation 955. The operations 1410 and optionally 1415 are performed for each obfuscated attribute value for which form data is received from the requesting device 110.

Figure 15:
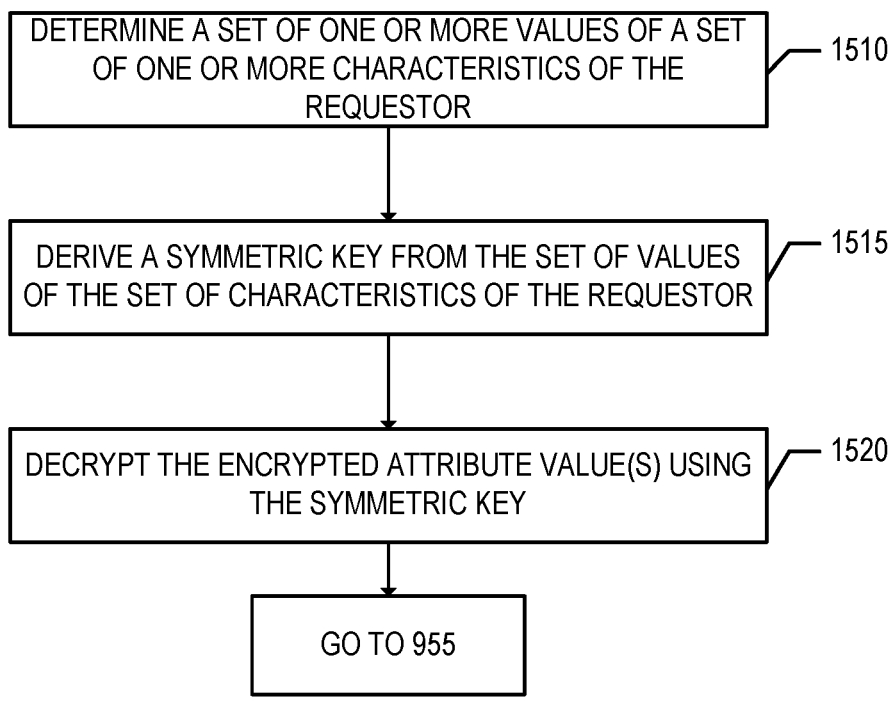
FIG. 15 is a flow diagram that illustrates exemplary operations for deobfuscating an obfuscated attribute value when the obfuscation occurred in accordance with FIG. 12 according to one embodiment.

FIG. 15 is a flow diagram that illustrates exemplary operations for deobfuscating an obfuscated attribute value when the obfuscation occurred in accordance with FIG. 12 according to one embodiment. At operation 1510, the proxy server 115 determines a set of one or more values of a set of one or more characteristics respectively of the network application 112 of the requesting device 110. The set of characteristics is the same as described with respect to operation 1210. If the form data is received from the same network application 112 as transmitted the request for the web page, it is likely that the set of values of the set of characteristics will also be the same. For example, if the set of characteristics consists of the IP address used by the network application 112, it is likely that the same IP address value is used when transmitting the request for the web page as when transmitting the form data of the web page. If the same values are used, the same symmetric key will be derived. Flow then moves to operation 1515 where the proxy server 115 derives a symmetric key from the set of values of the set characteristics of the requesting device in the same way as described with respect to operation 1215. Flow then moves to operation 1520 where the proxy server 115 decrypts the encrypted value using at least the symmetric key. The proxy server 115 may also check a magic value for confirmation if used. Flow then moves to operation 955.

Figure 16:
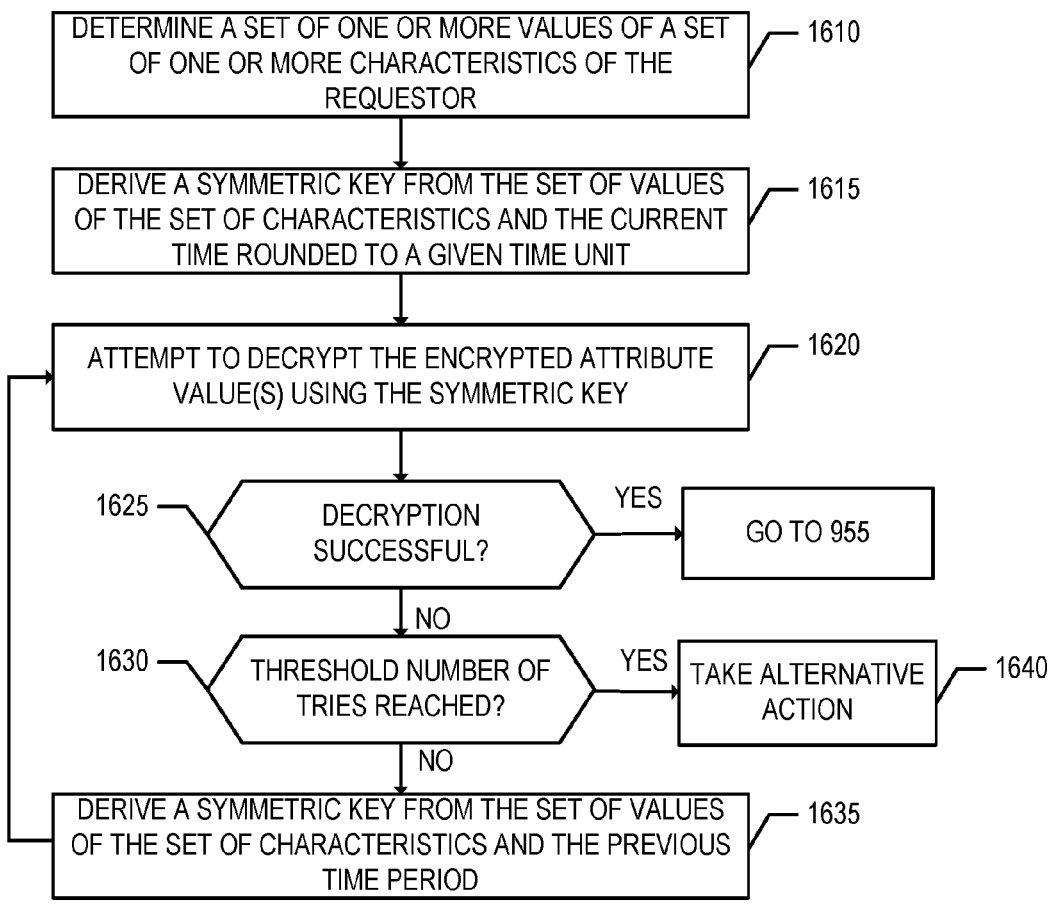
FIG. 16 is a flow diagram that illustrates exemplary operations for deobfuscating an obfuscated attribute value when the obfuscation occurred in accordance with FIG. 13 according to one embodiment.

FIG. 16 is a flow diagram that illustrates exemplary operations for deobfuscating an obfuscated attribute value when the obfuscation occurred in accordance with FIG. 13 according to one embodiment. The operations of FIG. 16 are similar to the operations of FIG. 15 with the addition that the symmetric key that is derived also takes into account a time period. At operation 1610, the proxy server 115 determines a set of one or more values of a set of one or more characteristics respectively of the network application 112 of the requesting device 110. The set of characteristics is the same as described with respect to operation 1310. Flow then moves to operation 1615 where the proxy server 115 derives a symmetric key from the set of values of the set characteristics and the current time rounded to a given time unit in the same way as described with respect to operation 1315. Flow then moves to operation 1620 where the proxy server 115 attempts to decrypt the encrypted value using the symmetric key.

Flow then moves to operation 1625 where the proxy server 115 determines whether the decryption was successful. To determine whether the decryption was successful, a Keyed-Hashing Message Authentication Code (HMAC) may be used or an authenticated encryption mode (such as Advanced Encryption Standard-Galois/Counter Mode (AES-GCM)) may be used. For example, in one embodiment the proxy server 115 generated a MAC in conjunction with encrypting the attribute value (e.g., a MAC created on the original attribute value) and stored it in a predefined portion of the obfuscated attribute value. The predefined portion containing the MAC value is removed by the proxy server 115 prior to decrypting the attribute value. The proxy server 115 generates a MAC over the decrypted attribute value and compares that MAC with the MAC value removed from the form data to determine whether the MACs are the same, which is an indication that decryption was successful. If decryption is successful, then flow moves to operation 955. If decryption is unsuccessful, then flow moves to operation 1630 where the proxy server 115 determines whether a threshold number of tries has been reached. If the threshold number of tries has been reached, then flow moves to operation 1640 where alternative action is taken (e.g., a message is sent to the requesting device 110 that indicates that form data could not be read, a message is sent to the requesting device 110 that causes the requesting device 110 to issue a new request for the web page that will start the process over, etc.). If the threshold number of tries has not been reached, then flow moves to operation 1635 where the proxy server 115 derives a symmetric key from the set of values of the set of characteristics and the most immediately previous time period. For example, if the time period is rounded by day, the proxy server 115 uses the previous day when deriving the symmetric key. Flow then moves back to operation 1620.

FIGS. 15 and 16 describe an embodiment where a symmetric key is derived from a set of characteristics and that key is used to deobfuscate the obfuscated form attribute values. In another embodiment, a key that is not shared with the requesting client and that is not derived from a set of characteristics is used to deobfuscate the form attribute values. For example, the key may be stored at the proxy server 115. A random value may be prepended or appended to each value prior to encryption to provide for randomness; therefore when decrypting, the random value may be removed prior to decryption.

With reference back to FIG. 9, flow moves from operation 950 to operation 955 after the obfuscated attribute value(s) have been deobfuscated, where the proxy server 115 transmits the form data for the deobfuscated form attribute value(s) (which will be the original form attribute value(s)) to the origin server 120 for further processing. For example, the origin server 120 receives the form data and processes it according to the functionality of the web page and web form.

While embodiments have been described with respect to a proxy server obfuscating and deobfuscating the form attribute values, in other embodiments similar techniques may be used at the origin server or in a different network architecture. For example, an origin server may obfuscate the form attribute value(s) prior to transmitting the web page to the requesting device and deobfuscate the form attribute value(s) when receiving form data.

While embodiments have been described with respect to obfuscating and deobfuscating form attribute values, in other embodiments the name part of the form attribute may be obfuscated and deobfuscated in a similar manner (either in addition to, or in lieu of, obfuscating and deobfuscating the value part of the form attribute). In such embodiments, a client-side script may be added to the web page that is configured to, when executed by the client device, de-obfuscate at least the obfuscated name part of the form attribute in order to process that form value. For example, the client-side script may access a mapping (e.g., stored on the web page) between the obfuscated name part of the form attribute and the original name part of the form attribute value (which may be encrypted) to determine the original name part of the form attribute value. In other embodiments, the web page is modified such that the client-side script processes the form and transmits the form data for the obfuscated form attributes (including those in which the name part of the form attribute is obfuscated) upon submission.

The techniques shown in the figures can be implemented using code and data stored and executed on one or more electronic devices (e.g., a requesting device, a proxy server, an origin server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server that is coupled with an origin server, comprising;
   receiving, from a requesting device, a request for a web page of the origin server;
   retrieving the requested web page;
   determining that the retrieved web page includes a web form that includes a set of one or more form attribute values for obfuscation;
   modifying the retrieved web page including obfuscating the set of form attribute values into a corresponding set of one more obfuscated form attribute values, wherein obfuscating the set of form attribute values includes performing the following:
      determining a first set of one or more values of a set of one or more characteristics of the requesting device,
      deriving a first symmetric key from at least the first set of values and a first current time of the obfuscation rounded to a particular time unit, and
      encrypting the set of form attribute values using the first symmetric key;

transmitting the modified web page to the requesting device, wherein the set of form attribute values in their original form is not included in the modified web page;

receiving, from the requesting device, form data for the set of obfuscated form attribute values;

deobfuscating the set of obfuscated form attribute values thereby revealing the set of form attribute values, wherein deobfuscating the set of obfuscated form attribute values includes performing the following:
  determining a second set of one or more values of the set of characteristics of the requesting device,
  deriving a second symmetric key from at least the second set of values and a second current time of the deobfuscation rounded to the particular time unit, and
  attempting to decrypt the set of obfuscated form attribute values using the second symmetric key; and responsive to the deobfuscation, transmitting the form data with the set of form attribute values to the origin server.

2. The method of claim 1, wherein retrieving the requested web page includes transmitting a request for the web page to the origin server and receiving a response from the origin server that includes the requested web page.

3. The method of claim 1, wherein retrieving the requested web page includes accessing the requested web page from a cache that is available to the proxy server.

4. The method of claim 1, wherein modifying the retrieved web page further includes:
  modifying a reference to at least one of the set of form attribute values for obfuscation to refer to the corresponding obfuscated form attribute value instead of that at least one of the set of form attribute values for obfuscation.

5. The method of claim 1, wherein the set of form attribute values includes one or more of the following:
  a name form attribute value;
  an id form attribute value; and
  a class name form attribute value.

6. The method of claim 1, further comprising:
  wherein deobfuscating the set of obfuscated form attribute values further includes performing the following:
    responsive to determining that the decryption of the set of obfuscated form attribute values using the second symmetric key was not successful, performing the following a threshold number of times, wherein the threshold number of times is greater than or equal to one:
      deriving another symmetric key from at least the second set of values and a most previous time period from a most previous attempt at decrypting the set of obfuscated form attribute values, and
      attempting to decrypt the set of obfuscated form attribute values using the another symmetric key.

7. A non-transitory machine-readable storage medium that provides instructions that, when executed by a processor of a proxy server, cause said processor to perform operations comprising:
  receiving, from a requesting device, a request for a web page of an origin server;
  retrieving the requested web page;
  determining that the retrieved web page includes a web form that includes a set of one or more form attribute values for obfuscation;
  modifying the retrieved web page including obfuscating the set of form attribute values into a corresponding set of one more obfuscated form attribute values, wherein obfuscating the set of form attribute values includes performing the following:
    determining a first set of one or more values of a set of one or more characteristics of the requesting device,
    deriving a first symmetric key from at least the first set of values and a first current time of the obfuscation rounded to a particular time unit, and
    encrypting the set of form attribute values using the first symmetric key;
  transmitting the modified web page to the requesting device, wherein the set of form attribute values in their original form is not included in the modified web page;
  receiving, from the requesting device, form data for the set of obfuscated form attribute values;
  deobfuscating the set of obfuscated form attribute values thereby revealing the set of form attribute values, wherein deobfuscating the set of obfuscated form attribute values includes performing the following:
    determining a second set of one or more values of the set of characteristics of the requesting device,
    deriving a second symmetric key from at least the second set of values and a second current time of the deobfuscation rounded to the particular time unit, and
    attempting to decrypt the set of obfuscated form attribute values using the second symmetric key; and
  responsive to the deobfuscation, transmitting the form data with the set of form attribute values to the origin server.

8. The non-transitory machine-readable storage medium of claim 7, wherein retrieving the requested web page includes transmitting a request for the web page to the origin server and receiving a response from the origin server that includes the requested web page.

9. The non-transitory machine-readable storage medium of claim 7, wherein retrieving the requested web page includes accessing the requested web page from a cache that is available to the proxy server.

10. The non-transitory machine-readable storage medium of claim 7, wherein modifying the retrieved web page further includes:
  modifying a reference to at least one of the set of form attribute values for obfuscation to refer to the corresponding obfuscated form attribute value instead of that at least one of the set of form attribute values for obfuscation.

11. The non-transitory machine-readable storage medium of claim 7, wherein the set of form attribute values includes one or more of the following:
  a name form attribute value;
  an id form attribute value; and
  a class name form attribute value.

12. The non-transitory machine-readable storage medium of claim 7, further comprising:
  wherein deobfuscating the set of obfuscated form attribute values further includes performing the following:
    responsive to determining that the decryption of the set of obfuscated form attribute values using the second symmetric key was not successful, performing the following a threshold number of times, wherein the threshold number of times is greater than or equal to one:
      deriving another symmetric key from at least the second set of values and a most previous time period from a most previous attempt at decrypting the set of obfuscated form attribute values, and attempting to decrypt the set of obfuscated form attribute values using the another symmetric key.

13. A proxy server, comprising:
a set of one or more processors;
a set of one or more non-transitory machine-readable storage mediums that store instructions that, when executed by the set of processors, cause the proxy server to perform the following:
receive, from a requesting device, a request for a web page of an origin server;
retrieve the requested web page;
determine that the retrieved web page includes a web form that includes a set of one or more form attribute values for obfuscation;
modify the retrieved web page including obfuscating the set of form attribute values into a corresponding set of one more obfuscated form attribute values, wherein obfuscation of the set of form attribute values includes performing the following:
determine a first set of one or more values of a set of one or more characteristics of the requesting device,
derive a first symmetric key from at least the first set of values and a first current time of the obfuscation rounded to a particular time unit, and
encrypt the set of form attribute values using the first symmetric key;
transmit the modified web page to the requesting device, wherein the set of form attribute values in their original form is not included in the modified web page;
receive, from the requesting device, form data for the set of obfuscated form attribute values;
deobfuscate the set of obfuscated form attribute values thereby revealing the set of form attribute values, wherein deobfuscation of the set of obfuscated form attribute values includes performing the following:
determine a second set of one or more values of the set of characteristics of the requesting device,
derive a second symmetric key from at least the second set of values and a second current time of the deobfuscation rounded to the particular time unit, and
attempt to decrypt the set of obfuscated form attribute values using the second symmetric key; and
responsive to the deobfuscation, transmit the form data with the set of form attribute values to the origin server.

14. The proxy server of claim 13, wherein retrieval of the requested web page includes a transmission of a request for the web page to the origin server and receiving a response from the origin server that includes the requested web page.

15. The proxy server of claim 13, wherein retrieval of the requested web page includes an access of the requested web page from a cache that is available to the proxy server.

16. The proxy server of claim 13, wherein modification of the retrieved web page further includes a modification of a reference to at least one of the set of form attribute values for obfuscation to refer to the corresponding obfuscated form attribute value instead of that at least one of the set of form attribute values for obfuscation.

17. The proxy server of claim 13, wherein the set of form attribute values includes one or more of the following:
a name form attribute value;
an id form attribute value; and
a class name form attribute value.

18. The proxy server of claim 13, wherein deobfuscation of the set of obfuscated form attribute values further includes performing the following:
responsive to a determination that the decryption of the set of obfuscated form attribute values using the second symmetric key was not successful, perform the following a threshold number of times, wherein the threshold number of times is greater than or equal to one:
derive another symmetric key from at least the second set of values and a most previous time period from a most previous attempt at decrypting the set of obfuscated form attribute values, and
attempt to decrypt the set of obfuscated form attribute values using the another symmetric key.

* * * * *